United States Patent [19]

Brackmann et al.

[11] 3,985,481
[45] Oct. 12, 1976

[54] EXTRUSION HEAD FOR PRODUCING POLYMERIC MATERIAL FIBRES

[75] Inventors: Warren A. Brackmann, Cooksville; Daniel DiIanni, Toronto, both of Canada

[73] Assignee: Rothmans of Pall Mall Canada Limited, Toronto, Canada

[22] Filed: Sept. 24, 1975

[21] Appl. No.: 616,426

Related U.S. Application Data

[62] Division of Ser. No. 530,708, Dec. 9, 1974.

[52] U.S. Cl. .................... 425/72 S; 425/464; 264/176 F
[51] Int. Cl.² ................................. B29F 3/04
[58] Field of Search ...... 264/176 F, 177 F, DIG. 25; 425/72 S, 464, 131.5, 378 S, 379 S, DIG. 217; 65/5, 16

[56] References Cited
UNITED STATES PATENTS

| | | | |
|---|---|---|---|
| 2,411,660 | 11/1946 | Manning | 264/DIG. 75 |
| 2,571,457 | 10/1951 | Ladisch | 65/5 X |
| 3,379,811 | 4/1968 | Hartmann et al. | 425/72 S |
| 3,825,379 | 7/1974 | Lohkamp et al. | 425/72 S |
| 3,825,380 | 7/1974 | Harding et al. | 425/72 S |
| 3,888,610 | 6/1975 | Brackmann et al. | 425/72 S |
| 3,954,361 | 5/1976 | Page | 425/464 X |

*Primary Examiner*—Francis S. Husar
*Assistant Examiner*—Mark Rosenbaum
*Attorney, Agent, or Firm*—Sim & McBurney

[57] ABSTRACT

An extrusion head is provided in which molten polymeric material is formed into fibres by providing individual air streams for each orifice of a plurality of extrusion orifices formed in a straight line across the width of the head to draw out and convey individual polymeric material fibres from polymeric material extruded from each orifice, the individual fibres being separated from each other by the individual air streams to prevent coalescing of the fibres to form bundles while they are still molten. Each orifice is formed at the line of intersection of two sloping surfaces of a unitary wedge shaped body and preferably has a circular cross section in the elevational view and a part-elliptical cross section in the plan view to allow metering of the extruded molten material into the air streams over a flow path immediately upstream of the line of intersection.

8 Claims, 6 Drawing Figures

EXTRUSION HEAD FOR PRODUCING POLYMERIC MATERIAL FIBRES

REFERENCE TO RELATED APPLICATION

This application is a division of application Ser. No. 530,708 filed Dec. 9, 1974.

FIELD OF INVENTION

The present invention is directed to the formation of polymeric fibres, in particular to an extrusion head for use in an apparatus for the production of polymeric fibres.

BACKGROUND TO THE INVENTION

In an article entitled "Superfine Thermoplastic Fibres" by Van A. Wente in Industrial and Engineering Chemistry vol. 48, no. 8, Aug. 1956, pp. 1342 to 1346, there is described an extrusion head for producing thermoplastic material fibres of extremely small fibre size. The head includes a nozzle provided in two cooperating joined halves with a plurality of fine extrusion channels extending through the head and terminating in circular orifices. The channels are provided by slots milled in a flat surface of one half of the head and then matched with identical slots milled into an abutting surface of the other half of the head.

Two converging high velocity hot streams of air are provided by two elongated openings positioned in the extrusion head and extending parallel to the row of orifices and slightly beyond the two lateral extremities of the row.

The use of two lamina convergent flows of air to draw out and convey filaments from molten material extruded from the row of orifices provides control difficulties in ensuring that the filaments do not become joined or otherwise associated with one another, and hence form bundles or ropes, until they have cooled sufficiently and are desired to be collected.

In addition, considerably more air volume is required than is actually used in the drawing and conveying of the filaments, resulting in waste of air and the heat value thereof.

One attempt to overcome these problems is described in U.S. Pat. No. 3,888,610, wherein molten polymeric material is extruded from a plurality of needle-like conduits communicating with a common source of polymeric material. The conduits each have circular orifices so that polymeric material extruded therefrom is unconfined in all directions. A separate flow stream of hot air is provided for each conduit to draw filaments from the extruded molten material and to maintain the filaments separate from one another until they may be collected without roping.

Considerable control difficulties have arisen with this arrangement, resulting in many instances in the production of considerable quantities of spherical polymer particles rather than the described fibres. Thus, unless the flow rates of molten material and air are carefully controlled, difficulties arise in consistently producing fibres.

An additional problem arises in the use of the nozzle described in the Wente article. The pressure required for extrusion of the molten material sometimes causes separation of the two body halves, leading to the complete absence of proper filament formation.

SUMMARY OF INVENTION

The present invention, in contrast to this prior art, provides an extrusion head which is reliable and operable over a wide range of conditions without bundling or forming non-fibred polymer.

The extrusion head comprises an elongate body member having a generally wedge shaped cross section including two planar sloping faces convergent to and terminating at a line of intersection; a plurality of capillary-like substantially circularly cross sectioned channels of substantially the same cross-sectional size located in the body member and each extending from an individual orifice formed at the line of intersection spaced apart from the individual orifices of the other channels internally of the body member substantially parallel to and separated from others of the channels and substantially perpendicular to the line of intersection; each of the orifices typically having a circular cross section in elevation view and a part-elliptical cross section in plan view; first supply means in fluid flow communication with the ends of the plurality of channels remote from the line of intersection for feeding molten polymeric material to the plurality of channels towards the orifices; a first elongate block member having a face of complementary shape to that of the two planar sloping faces and secured in engagement with the one of the two planar sloping faces, a second elongate block member having a face of complementary shape to that of the other of the two planar sloping faces and secured in engagement with the other of the two planar sloping faces; the complementarily-shaped faces each having one longitudinal edge located substantially common with the line of intersection, whereby the block members engage each other at the line of intersection; a plurality of grooves formed in each of the complementarily-shaped faces of equal number to each other and to the number of the plurality of capillary-like channels, each of the grooves defining a passage with the adjacent planar sloping face of the body member; the grooves in each of the complementarily-shaped faces being parallel to each other and extending substantially perpendicularly to the one longitudinal edge of the respective complementarily-shaped face, each of the grooves having substantially the same cross-sectional shape; respective grooves in each complementarily-shaped face being arranged to lie in a plane including one of the channels and situated substantially perpendicularly to the line of intersection; respective grooves terminating at the line of intersection in an opening, typically dimensioned to include the circular cross section of the particular orifice of the one of the channels in its periphery when viewed in elevational view; and second supply means in fluid flow communication with each of the plurality of passages remote from the line of intersection for feeding air under pressure to the plurality of passages towards the line of intersection.

Thus, in the present invention, individual air streams are associated with individual extrusion orifices achieving effective separation of fibres one from another by the air streams at least during the period immediately after extrusion and hence the tendency to form bundles of joined fibres is minimized.

Further, all the hot air which is provided at the line of intersection is utilized to draw fibres from the extruded mass thereby achieving economic air and heat utilization. Additionally, the orifices through which the molten polymeric material is extruded are shaped so that progressively a greater quantity of molten material is fed into the air streams and the molten material is confined laterally. This procedure allows the ready control of the formation of fibres and the formation of material particles of polymeric material is substantiallly eliminated.

DESCRIPTION OF PREFERRED EMBODIMENT

Figure 1:
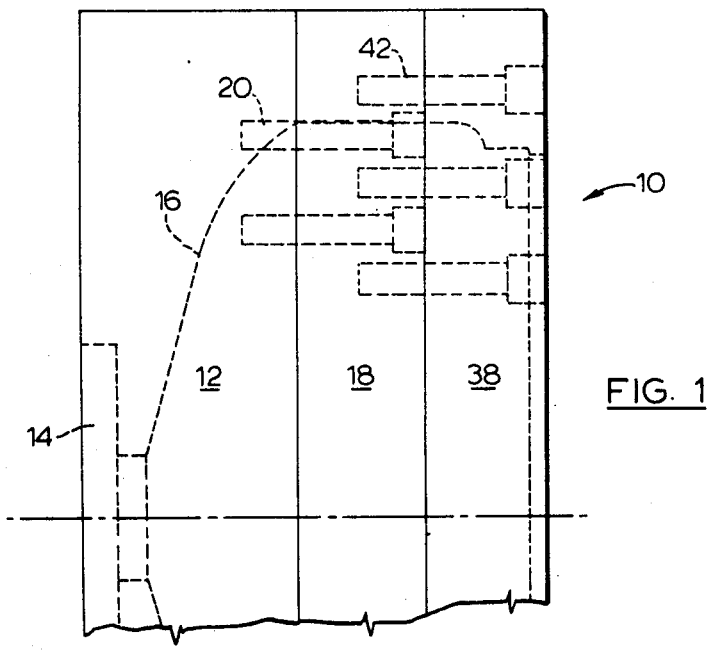
FIG. 1 is a plan view of an extrusion head in accordance with one embodiment of the invention.
Figure 2:
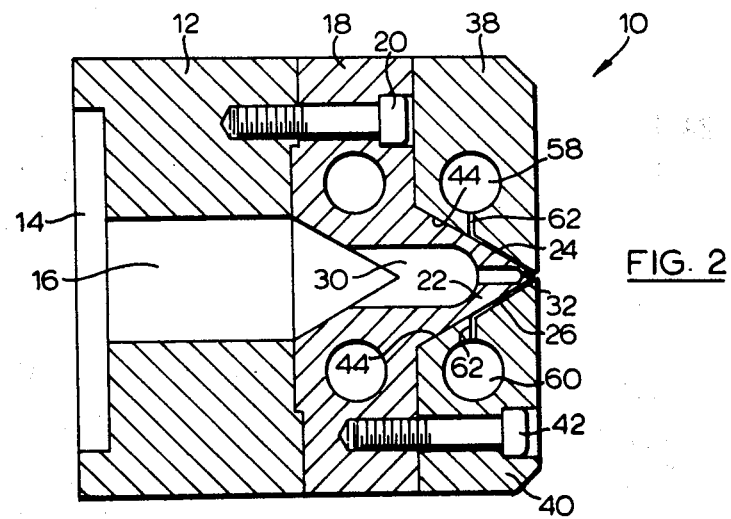
FIG. 2 is a sectional view taken on line 2—2 of FIG. 1.
Figure 3:
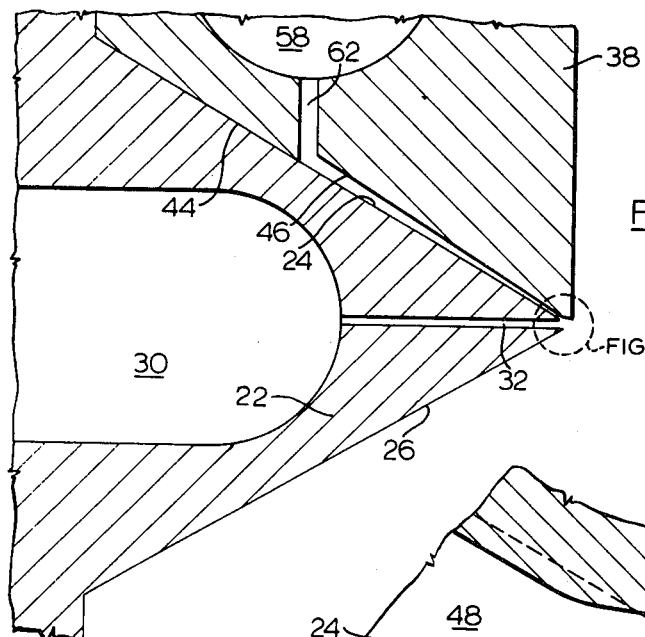
FIG. 3 is an enlarged detail of part of the sectional view of FIG. 2.

As seen in the drawing, an extrusion head 10 includes an elongate rectangular support block 12 having an opening 14 in one side thereof to receive molten polymeric material from an extruder (not shown) of any convenient construction. The opening 14 is associated with an internal chamber 16 to establish a feed means source of molten polymeric material in the extrusion head 10.

A body member 18 is secured by bolts 20 to the support block 12 and has an elongate protrusion 22 extending from one face thereof, the protrusion having converging planar faces 24 and 26 converging to and terminating at a line of intersection 28.

A cavity 30 in fluid flow communication with the internal chamber 16 is provided in the body member 18. A plurality of capillary-like channels 32 is provided extending from and perpendicularly to the line of intersection 28 to the cavity 30 to establish a plurality of separate parallel liquid polymer flow paths from the cavity 30 to exteriorly of the body member 18.

The channels 32 have the same substantially circular cross-sectional dimension, are parallel to and separated from each other and terminate in an orifice 34 at the line of intersection 28.

Figure 5:
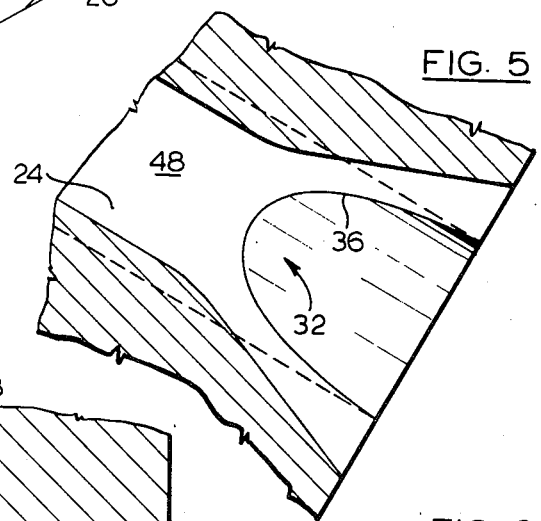
FIG. 5 is a plan view of the orifice shown in FIG. 4 taken along line 5—5 thereof.
Figure 6:
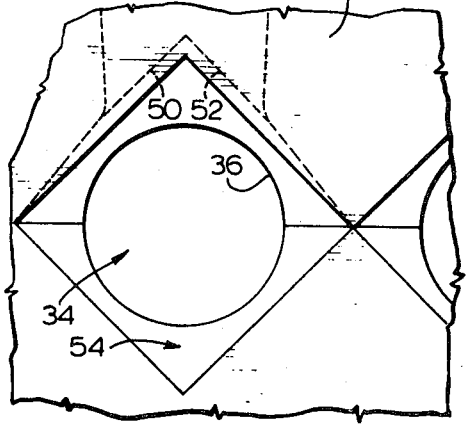
FIG. 6 is an elevational view of the orifice shown in FIG. 4.

As may clearly be seen in FIGS. 5 and 6, in the illustrated embodiment the orifices 34 in elevation view (FIG. 6) have a circular cross section while in the plan view (FIG. 5) they have a part-elliptical cross section, as defined by the periphery 36.

The plan view of the orifice in FIG. 5 illustrates a part-elliptical periphery 36. This shape is preferred since it is readily provided in drilling of the channels 34. However, any other desired geometrical shape, such as parabolic, triangular, oval or part-rectangular, may be provided, to meter extruded molten material vertically from the orifice 34 while the molten material is laterally confined.

Similarly, the circular elevational-view shape of the orifices 34 is preferred, but may be provided in any desired geometrical shape, such as oval, oblong or square.

Two elongated block members 38 and 40 are situated one on each vertical side of the protrusion 22 and are secured to the body member 18 by bolts 42. Each of the block members 38 and 40 has a face 44 complementarily angled with respect to the adjacent planar face 24 and 26 of the protrusion 22 and is in engagement therewith. The faces 44 have one longitudinal edge which engage each other the line of intersection 28.

In each of the faces 44 is situated a plurality of grooves 46 which extend from the line of intersection 28 perpendicularly thereto in parallel fashion and in number the same as the number of channels 34.

The grooves 46 define with the adjacent planar face 24 and 26 of the protrusion 22 a plurality of passages 48. The grooves 46 in the illustrated embodiment each has walls 50 and 52 which meet at an angle. The respective grooves in the blocks 38 and 40 and one of the channels 34 lie in the same vertical plane with the plane being perpendicular to the line of intersection 28, so that the respective grooves 46 meet in an opening 54 at the line of intersection 28.

The grooves 46 preferably are dimensioned and shaped so that in the elevational view the opening 54 is square and encompasses the periphery 36 of the respective orifice 34 wholly within its periphery. The latter dimensioning is preferred to minimize gumming or clogging of the opening 54 by any polymeric material not drawn through the opening 54 with the air stream. While the opening 54 is shown as being square, for ease of formation thereof, different cross sectional forms may be provided, such as circular.

Figure 4:
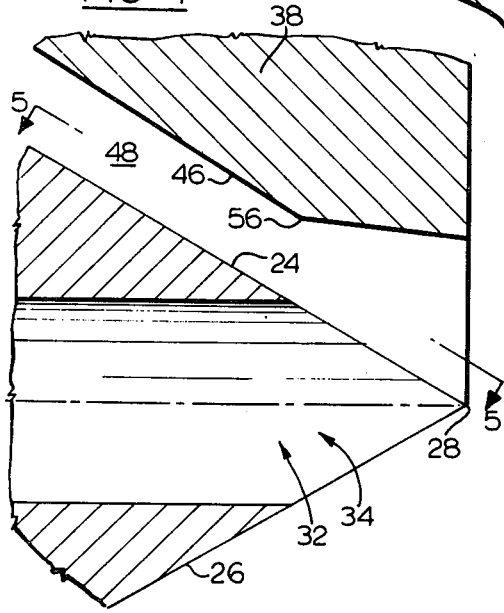
FIG. 4 is a much enlarged detail of part of the sectional view of FIG. 3.

As may be seen in detail in FIG. 4, the walls 52 and 54 of the grooves 46 are dimensioned so that the cross-sectional area thereof decreases while the lateral spacing of the free extremities of the walls 52 and 54 decreases, i.e. the opening flares inwardly, from the line of intersection 28 to a throat or shoulder 56 located immediately forwardly of the innermost position of periphery 36 of the orifice 34 and thereafter the grooves 46 increase in cross sectional dimension at a slower rate than the decrease in cross sectional area. The provision of the shoulder 56 in this way may provide a nozzle effect, the air in the passages 48 accelerating to the shoulder 56 and thereafter, under the influence of the pressure at the shoulder 56, accelerating further in the expansion chamber between the shoulder 56 and the orifice 34. The shoulder 56 may be omitted, if desired, providing the grooves 46 with the same cross sectional size along the length thereof.

An elongated gallery 58 and 60 is located within and extends substantially coextensive of the block members 38 and 40 and the galleries 58 and 60 are situated in fluid flow communication with a source of compressed air (not shown).

A plurality of separate conduits 62 join the galleries 58 and 60 to the plurality of passages 48, thereby establishing compressed air supply means in fluid flow communication with the passages 48, providing for each orifice 34 two converging air streams in the passages 48.

Molten polymeric material is extruded into each of the converging air streams from the opposite vertical sides of the (plan view) part elliptical opening of the orifice 34, while the molten polymeric material is confined laterally by the metal defining the elliptical perimeter 36 of the orifice 34.

The extrusion of the molten polymeric material takes place over a path length of each of the converging air streams immediately upstream of the line of intersection 28 which also constitutes the point of merger of the streams. The polymeric material thus is metered into the converging streams in increasing amounts while the streams are separate and the metering is substantially complete immediately prior to merging of the convergent streams at the line of intersection 28, while the molten material is prevented from being extruded other than into the converging air streams.

The presentation of the extruded molten material gradually into the converging air streams results in a reliable, clean-operating system operable over a wide range of conditions, in contrast to the procedure in accordance with U.S. Pat. No. 3,888,610 mentioned above.

The high speed merged air stream then draws or stretches the extruded material into a fibre which is converged by the air stream flowing through the opening 54 and away from the extrusion head. The fiber is encased by the air stream and hence is insulated from the other fibres. The contact of fibres formed from the extruded material at the orifices 34 one with another prior to their solidification is avoided, thereby overcoming the bundling problem of the prior art nozzle disclosed in the Wente article.

Since all the compressed air in the galleries 58 and 60 is used to draw fibres from the extruded molten material by use of the passages 48, the wasteful use of air and the heat content thereof as described in the prior art is avoided.

By positioning the shoulder 56 immediately forward of the rearward extremity of the periphery 36 of the orifice 34, the molten polymeric material is first exposed to the converging air streams when the latter have achieved their highest velocity in the passages 48 upstream of the shoulder 56 and thereafter the extruded polymeric material is subjected to an air stream accelerating towards the opening 54.

The extrusion head of the invention may be used to form filaments from a variety of polymeric materials, including polymers or copolymers of olefins, polymerizable esters and polymerizable amides. Polyolefins which may be used include polyethylene, polypropylene and polymers of substituted olefins, such as polytrifluorochloroethylene. Many polyesters may be used, such as polyethylene terephthalate and poly (methyl methacrylate.) A typical poly (methyl methacrylate) which may be used is that sold under the trademark "ACRYLITE" H. 12. Among the polyamides which may be utilized are nylon 6, nylon 66 and nylon 610. Other thermoplastic polymeric materials such as polystyrene also may be employed.

SUMMARY

The present invention therefore provides an extrusion head which allows the reliable continuous production of polymeric material fibres from molten polymeric material with economic utilization of air.

What we claim is:

1. An extrusion head for the formation of polymeric material fibers comprising:
    an elongate body member having a generally wedge-shaped cross section including two substantially planar sloping faces convergent to and terminating at a line of intersection,
    a plurality of capillary-like channels of substantially the same cross-sectional size and circular cross section located in said body member and each extending from an individual orifice formed at said line of intersection spaced apart from the individual orifice of the other channels internally of said body member substantially parallel to and separated from others of said channels and substantially perpendicular to said line of intersection, whereby the axis of each of said channels and said line of intersection lie in a first plane,
    first supply means in fluid flow communication with the ends of said plurality of channels remote from said line of intersection for feeding molten polymeric material through said plurality of channels towards said orifices,
    a first elongate block member having a face of complementary shape to that of one of said two planar sloping faces and secured in engagement with said one of said two planar sloping faces, a second elongate block member having a face of complementary shape to that of the other of said two planar sloping faces and secured in engagement with said other of said two planar sloping faces,
    said complementary-shaped faces each having one longitudinal edge located substantially common with said line of intersection, whereby said block members engage each other at said line of intersection,
    a plurality of grooves formed in each of said complementarily-shaped faces of equal number to each other and to the number of said plurality of capillary-like channels, each of said grooves defining a passage with the adjacent planar sloping face of said body member,
    said grooves in each said complementarily-shaped face being parallel to each other and having substantially the same cross-sectional shape,
    respective grooves in each said complementarily-shaped face and one of said channels being arranged to lie in a second plane situated substantially perpendicularly to said line of intersection and to said first plane,
    respective grooves terminating at said line of intersection in an opening, and
    second supply means in fluid flow communication with each of said plurality of passages remote from said line of intersection for feeding air under pressure to said plurality of passages towards said line of intersection,
    each of said orifices having a circular cross section when viewed along the intersection of said first and second planes and having a part-elliptical cross section when viewed along said second plane towards said first plane.

2. The extrusion head of claim 1 wherein the opening at the termination of the respective grooves is dimensioned to include the circular cross section of the particular orifice of said one of said channels within its periphery when viewed along said intersection of said first and second planes.

3. The extrusion head of claim 2 wherein the openings at the line of intersection are square.

4. The extrusion head of claim 1 wherein said body member is formed integrally with a support member and said first supply means includes a chamber provided in said support member and in which said remote ends of said plurality of channels terminate, said chamber having a feed opening on the side of said support member opposite to said body member.

5. The extrusion head of claim 4 wherein said first and second elongate block members are mounted to said support member.

6. The extrusion head of claim 1 wherein said grooves decrease in cross-sectional size and flare inwardly from said line of intersection rearwardly thereof to a shoulder positioned just forward of the inner extremity of the periphery of the respective orifice and thereafter increase in cross-sectional size.

7. The extrusion head of claim 6 wherein said grooves at said line of intersection have first and second side walls converging to a right-angled join, whereby the openings at the line of intersection are square.

8. The extrusion head of claim 1 wherein said second supply means includes an elongate gallery extending laterally of each of said first and second elongate block members, a plurality of passages extending from said gallery to the end of said grooves remote from said line of intersection and feed means to feed compressed air to said elongate galleries.

* * * * *